United States Patent
Takata et al.

(10) Patent No.: US 11,423,099 B2
(45) Date of Patent: Aug. 23, 2022

(54) CLASSIFICATION APPARATUS, CLASSIFICATION METHOD, AND CLASSIFICATION PROGRAM

(71) Applicant: NIPPON TELEGRAPH AND TELEPHONE CORPORATION, Tokyo (JP)

(72) Inventors: Yuta Takata, Musashino (JP); Mitsuaki Akiyama, Musashino (JP); Takeshi Yagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 46 days.

(21) Appl. No.: 16/955,083

(22) PCT Filed: Sep. 27, 2018

(86) PCT No.: PCT/JP2018/035987
§ 371 (c)(1),
(2) Date: Jun. 18, 2020

(87) PCT Pub. No.: WO2019/123757
PCT Pub. Date: Jun. 27, 2019

(65) Prior Publication Data
US 2020/0372085 A1    Nov. 26, 2020

(30) Foreign Application Priority Data
Dec. 20, 2017  (JP) .............................. JP2017-243914

(51) Int. Cl.
*H04L 29/08* (2006.01)
*G06F 16/951* (2019.01)
(Continued)

(52) U.S. Cl.
CPC .......... *G06F 16/951* (2019.01); *G06F 16/958* (2019.01); *G06F 17/18* (2013.01);
(Continued)

(58) Field of Classification Search
CPC ............. H04L 63/1425; H04L 63/1441; H04L 63/145; H04L 67/02; H04L 63/1416;
(Continued)

(56) References Cited

U.S. PATENT DOCUMENTS

| | | | |
|---|---|---|---|
| 9,621,576 B1* | 4/2017 | Oprea | H04L 63/1425 |
| 2011/0145435 A1* | 6/2011 | Bhatawdekar | G06F 21/64 709/238 |

(Continued)

FOREIGN PATENT DOCUMENTS

JP    2005-208814 A    8/2005

OTHER PUBLICATIONS

Chiba et al, "DomainProfiler: Discovering Domain Names Abused in Future", 46th Annual IEEE/IFIP International Conference on Dependable System and Networks, 2016.*

(Continued)

*Primary Examiner* — Jungwon Chang
(74) *Attorney, Agent, or Firm* — Xsensus LLP

(57) ABSTRACT

A classification apparatus includes: a crawler unit that acquires access result data for a website, the access result data including website application information, web server information, and the like that are updated by an administrator of the website; an update history generation unit that generates an update history of the website by making comparison in chronological order between pieces of information included in the access result data for the website; a classifier generation unit that generates a classifier that classifies a website having a possibility of being abused in the future, by using, as a feature value, the update history of (Continued)

the website; and a classification unit that classifies, through the classifier generated, the website having the possibility of being abused in the future.

7 Claims, 12 Drawing Sheets

(51) Int. Cl.
| | | |
|---|---|---|
| *G06F 16/958* | (2019.01) | |
| *G06F 17/18* | (2006.01) | |
| *G06K 9/62* | (2022.01) | |
| *H04L 67/02* | (2022.01) | |
| *H04L 9/40* | (2022.01) | |

(52) U.S. Cl.
CPC ............ *G06K 9/6267* (2013.01); *H04L 67/02* (2013.01); *H04L 63/1416* (2013.01); *H04L 63/1433* (2013.01); *H04L 63/1483* (2013.01)

(58) Field of Classification Search
CPC ............. H04L 63/1433; H04L 63/1483; G06F 16/951; G06F 16/958; G06F 17/18; G06K 9/6267
See application file for complete search history.

(56) References Cited

U.S. PATENT DOCUMENTS

| | | | | |
|---|---|---|---|---|
| 2014/0059203 | A1* | 2/2014 | Trabelsi | ................. G06Q 50/01 709/224 |
| 2015/0200962 | A1 | 7/2015 | Xu et al. | |
| 2016/0364567 | A1* | 12/2016 | Akiyama | ................. G06F 21/56 |
| 2017/0293477 | A1* | 10/2017 | Takata | ................. G06F 16/951 |
| 2017/0359368 | A1* | 12/2017 | Hodgman | ........... H04L 63/1441 |
| 2018/0041530 | A1* | 2/2018 | Tang | ...................... G06F 16/951 |
| 2018/0048673 | A1* | 2/2018 | Hunt | ................... H04L 63/1425 |
| 2018/0309772 | A1* | 10/2018 | Song | .................... H04L 63/1441 |
| 2019/0356675 | A1* | 11/2019 | Takata | .................. H04L 63/145 |

OTHER PUBLICATIONS

International Search Report and Written Opinion dated Nov. 27, 2018 for PCT/JP2018/035987 filed on Sep. 27, 2018, 10 pages including English Translation of the International Search Report.
Canali. D., et al., "Prophiler: A Fast Filter for the Large-Scale Detection of Malicious Web Pages," International World Wide Web Conference Committee, Mar. 28-Apr. 1, 2011, 10 pages.
Ludl. C., et al., "On the Effectiveness of Techniques to Detect Phishing Sites," International Conference on Detection of Intrusions and Malware, and Vulnerability Assessment, 2007, 20 pages.
Borgolte. K., et al., "Meerkat: Detecting Website Defacements through Image-based Object Recognition," The Proceedings of the 24th USENIX Security Symposium, Aug. 12-14, 2015, pp. 595-610.
Soska K., and Christin N., "Automatically Detecting Vulnerable Websites Before They Turn Malicious," The Proceedings of the 23rd USENIX Security Symposium, Aug. 20-22, 2014, pp. 625-640.
Chiba. D., et al., "DomainProfiler: Discovering Domain Names Abused in Future," 46th Annual IEEE/IFIP International Conference on Dependable Systems and Networks, 2016, pp. 491-502.

* cited by examiner

FIG.3

| ID | Date | URL | NUMBER OF URLs | WEB APPLICATION INFORMATION | WEB SERVER INFORMATION | | CMS INFORMATION | | |
|---|---|---|---|---|---|---|---|---|---|
| | | | | meta[generator] | Server header | X-Powered-By header | detect-url | detect-meta | detect-header |
| 1 | 2013/09/01 00:00:00 | http://a.example/ | 10 | WordPress 3.6 | Apache/2.2.25 | PHP/5.3.27 | True | True | False |
| 2 | 2013/10/01 00:00:00 | http://a.example/ | 12 | WordPress 3.6.1 | Apache/2.2.25 | PHP/5.3.27 | True | True | False |
| 3 | 2013/11/01 00:00:00 | http://a.example/ | 14 | WordPress 3.7.1 | Apache/2.2.26 | PHP/5.3.28 | True | True | True |
| 4 | 2014/03/01 00:00:00 | http://b.example/ | 21 | WordPress 4.8 | Apache | PHP/7.0.21 | False | False | False |
| ⋮ | ⋮ | ⋮ | ⋮ | ⋮ | ⋮ | ⋮ | ⋮ | ⋮ | ⋮ |
| 101 | 2015/11/01 00:00:00 | http://c.example/ | 15 | | Apache | | False | False | False |
| 102 | 2016/02/01 00:00:00 | http://c.example/ | 15 | WordPress 4.4.2 | Apache | | True | True | False |
| 103 | 2016/09/01 00:00:00 | http://c.example/ | 10 | | nginx | | True | False | False |
| ⋮ | ⋮ | ⋮ | ⋮ | ⋮ | ⋮ | ⋮ | ⋮ | ⋮ | ⋮ |

FIG.5

| ID | Date | URL | NUMBER OF URLs | meta[generator] | Server header | X-Powered-By header | detect-url | detect-meta | detect-header |
|---|---|---|---|---|---|---|---|---|---|
| 101 | 2015/11/01 00:00:00 | http://c.example/ | 15 | | Apache | | False | False | False |
| | 3 | | Stable | Up | Stable | Stable | Up | Up | Stable |
| 102 | 2016/02/01 00:00:00 | http://c.example/ | 15 | WordPress 4.4.2 | Apache | | True | True | False |
| | 7 | | Down | Down | Updated | Stable | Stable | Down | Stable |
| 103 | 2016/09/01 00:00:00 | http://c.example/ | 10 | | nginx | | True | False | False |

501 →  (points to row between 101 and 102)
502 →  (points to row between 102 and 103)

Up: VALUE HAS BECOME OBSERVABLE
Stable: VALUE HAS NOT CHANGED
Updated: VALUE HAS CHANGED
Down: VALUE HAS BECOME UNOBSERVABLE

FIG.6

- EXAMPLE OF UPDATE HISTORY FOR SEED URL, "http://c.example/"
(CASE WHERE NUMBER OF TIMES COMPARISON IS MADE IS TWO)

| Delta | URLs | meta[generator] | Server header | X-Powered-By header | detect-url | detect-meta | detect-header |
|---|---|---|---|---|---|---|---|
| 3 | Stable | Up | Stable | Stable | Up | Up | Stable |
| 7 | Down | Down | Updated | Stable | Stable | Down | Stable |

- EXAMPLE OF UPDATE HISTORY FOR SEED URL, "http://c.example/"
(CASE WHERE NUMBER OF TIMES COMPARISON IS MADE IS THREE)

| Delta | URLs | meta[generator] | Server header | X-Powered-By header | detect-url | detect-meta | detect-header |
|---|---|---|---|---|---|---|---|
| 3 | Stable | Up | Stable | Stable | Up | Up | Stable |
| 7 | Down | Down | Updated | Stable | Stable | Down | Stable |
| -1 | -1 | -1 | -1 | -1 | -1 | -1 | -1 |

FIG.7

EXAMPLE OF FEATURE VECTOR FOR "http://c.example/"
(CASE WHERE NUMBER OF TIMES COMPARISON IS MADE IS THREE)

| | NUMBER OF URLs | | | meta[generator] | | | | Server header | | | | X-Powered-By header | | | | detect-url | | | detect-meta | | | detect-header | | |
|---|---|---|---|---|---|---|---|---|---|---|---|---|---|---|---|---|---|---|---|---|---|---|---|---|
| Delta | Up | Stable | Down | Up | Stable | Updated | Down | Up | Stable | Updated | Down | Up | Stable | Updated | Down | Up | Stable | Down | Up | Stable | Down | Up | Stable | Down |
| 3 | 0 | 1 | 0 | 1 | 0 | 0 | 0 | 0 | 1 | 0 | 0 | 0 | 1 | 0 | 0 | 1 | 0 | 0 | 1 | 0 | 0 | 0 | 1 | 0 |
| 7 | 0 | 0 | 1 | 0 | 0 | 1 | 1 | 0 | 0 | 1 | 0 | 0 | 1 | 0 | 0 | 0 | 1 | 0 | 0 | 0 | 1 | 0 | 1 | 0 |
| -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |

EXAMPLE OF FEATURE VECTOR
(3,0,1,0,1,0,0,0,0,1,0,0,0,1,0,0,1,0,0,0,1,0,7,0,0,1,
0,0,1,0,0,1,0,0,0,1,0,0,0,1,0,-1,-1,-1,-1,-1,-1,-1,
-1,-1,-1,-1,-1,-1,-1,-1,-1,-1,-1,-1,-1,-1,-1,-1,-1)

CLASSIFICATION APPARATUS, CLASSIFICATION METHOD, AND CLASSIFICATION PROGRAM

CROSS-REFERENCE TO RELATED APPLICATIONS

The present application is based on PCT filing PCT/JP2018/035987, filed Sep. 27, 2018, which claims priority to JP 2017-243914, filed Dec. 20, 2017, the entire contents of each are incorporated herein by reference.

FIELD

The present invention relates to a classification apparatus, a classification method, and a classification program.

BACKGROUND

Website defacement where websites of others are abused has been a problem. An attacker achieves his/her goal by, for example, defacing another person's website so that transfer to a malicious website is carried out, the malicious website being, for example, a website that launches a drive-by download attack or a phishing site. Such website defacement is caused by: abuse of vulnerability existing in a web server or a web application; or theft of website management information through malware infection.

In particular, threat posed by abuse of vulnerability existing in content management systems (CMSs) has been increasing year after year. CMSs are systems for generating, managing, and distributing websites and have been widely used by website administrators. However, because much vulnerability has been found in CMSs thus far and CMSs used for websites are able to be determined easily, their vulnerability has been abused frequently in website defacement. Accordingly, version updates and application of security patches by website administrators are important for prevention of website defacement.

However, in reality, such updates and application are not dealt with for long and unattended websites have been abused by attackers. It has actually been known that attackers efficiently find websites that are managed by vulnerable CMSs, by using search engines through a technique called "Dork". These websites found tend to become targets of attackers because these websites often have experience of long operation and known vulnerability. That is, websites that are managed and operated by unprepared administrators are presumably highly likely to be abused by attackers. Alerting administrators of such unattended websites based on reality of management and operation thereof up to that point is important for prevention of abuse of websites by attackers.

A method of finding a website that is managed by a CMS of an old version by using the Dork technique and alerting an administrator of the website is one of simple methods of carrying out such alerting. However, the administrator may be managing and operating the website appropriately and using the old version of the CMS intentionally for some reason. Therefore, just because a CMS used for a website is of an old version, the website cannot be said to have, as a rule, a possibility of being abused.

Methods of detecting drive-by download attacks, phishing, and hacktivism on websites have been known conventionally (as seen in Non-Patent Literature 1 to Non-Patent Literature 3). Furthermore, a method of designing feature values from a website before abuse and detecting the abuse of the website based on the feature values beforehand has been known (as seen in Non-Patent Literature 4). In all of the above mentioned methods, URLs and web content of websites are mainly used in designing of feature values useful for detection of abuse of a website.

CITATION LIST

Non-Patent Literature

Non-Patent Literature 1: D. Canali, et al., "Prophiler: A Fast Filter for the Large-Scale Detection of Malicious Web Pages", in World Wide Web Conference (WWW), 2011.

Non-Patent Literature 2: C. Ludl, et al., "On the Effectiveness of Techniques to Detect Phishing Sites", in Conference on Detection of Intrusions and Malware and Vulnerability Assessment (DIMVA), 2007.

Non-Patent Literature 3: K. Borgolte, et al., "Meerkat: Detecting Website Defacements through Image-based Object Recognition", in USENIX Security Symposium, 2015.

Non-Patent Literature 4: K. Soska, et al., "Automatically Detecting Vulnerable Websites Before They Turn Malicious", in USENIX Security Symposium, 2014.

SUMMARY

Technical Problem

However, a technique for accurately detecting beforehand a website having a possibility of being abused due to a state of management of the website by an administrator thereof has not been proposed in conventional technology. Therefore, an object of the present invention is to solve the above described problem to accurately detect beforehand a website having a possibility of being abused due to a state of management of the website by an administrator thereof.

Solution to Problem

To solve the above-described problems, the present invention is a classification apparatus, comprising: an acquisition unit that acquires access result data for websites updated by administrators of the websites, the access result data including information on the websites; an update history generation unit that generates update histories of the websites by making comparison between sets of access result data for the websites in chronological order; and a classifier generation unit that generates a classifier that classifies a website having a possibility of being abused in the future by using feature values that are the update histories of the websites.

Advantageous Effects of Invention

The present invention enables accurate detection of a website beforehand, the website having a possibility of being abused due to a state of management of the website by an administrator thereof.

BRIEF DESCRIPTION OF DRAWINGS

FIG. 3 is a diagram illustrating an example of an access result DB in FIG. 2.

FIG. 5 is a diagram illustrating an example of comparison between sets of access result data.

FIG. 6 is a diagram illustrating examples of update histories.

FIG. 7 is a diagram illustrating an example of a feature vector representing the update history in FIG. 6.

DESCRIPTION OF EMBODIMENTS

Outline

Described hereinafter while reference is made to the drawings is a mode (an embodiment) for implementation of the present invention.

A classification apparatus according to the embodiment constantly monitors websites and collects information considered to be attributable to administrators thereof from the websites. The classification apparatus then classifies websites that may be abused in the future by chronologically analyzing how the monitored websites have been managed and operated retroactively.

Classifier Generation Phase

Figure 1:
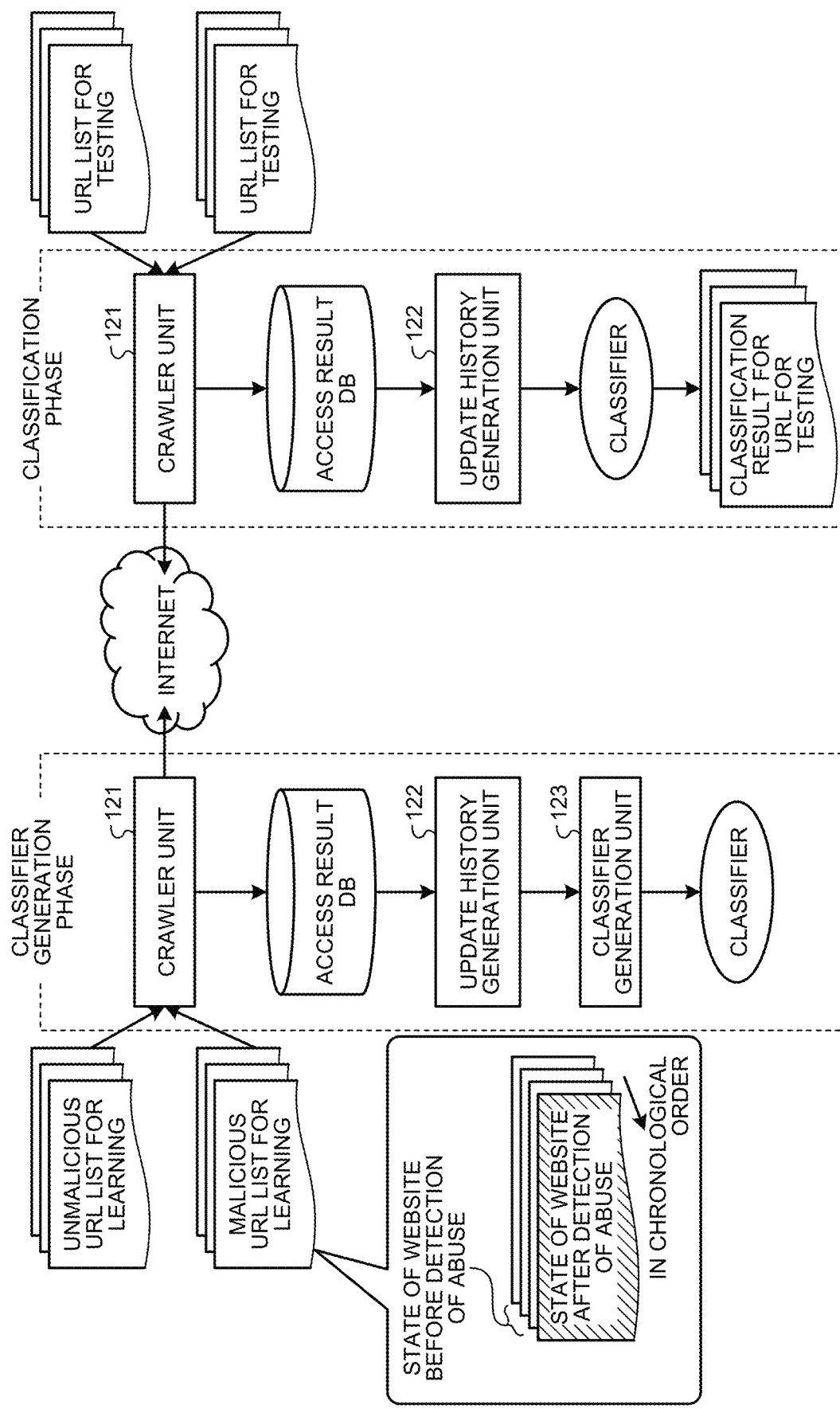
FIG. 1 is a diagram illustrating an outline of operation of a classification apparatus.

For example, as illustrated in FIG. 1, firstly, the classification apparatus accesses websites included in URL lists for learning (an unmalicious URL list for learning and a malicious URL list for learning) via the Internet through a crawler unit (acquisition unit) 121. The crawler unit 121 then collects access result data for the websites and accumulates the access result data into an access result DB. The access result data for the websites include information updated due to management by administrators of the websites (for example, web application information described later).

Furthermore, URL lists provided by service for archiving past states of various websites (as described in Document 1 cited below), for example, are used as the unmalicious URL list for learning and the malicious URL list for learning.
Document 1: Internet Archive, "Wayback Machine", https://archive.org/web/

For example, a URL list provided by service for archiving states of websites at different times after detection of abuse and before the detection of abuse is used as the malicious URL list for learning. Furthermore, a URL list provided by service for archiving states of websites at different times, the websites not having been abused, is used as the unmalicious URL list for learning.

Next, through an update history generation unit 122, the classification apparatus generates update histories of the websites by making comparison between sets of access result data for each website, the sets of access result data having been accumulated in the access result DB.

For example, through the update history generation unit 122, the classification apparatus generates an update history of a website that has been abused, based on access result data before detection of the abuse from access result data for the websites included in the malicious URL list for learning. That is, the update history of the website prior to the detection of the abuse is generated. Furthermore, through the update history generation unit 122, the classification apparatus generates an update history of a website that has not been abused, based on access result data for the websites included in the unmalicious URL list for learning.

A classifier generation unit 123 of the classification apparatus then generates a classifier that classifies websites having a possibility of being abused in the future by performing machine learning or the like through use of feature values that are the update histories of the websites that have been abused and the update histories of the websites that have not been abused.

Classification Phase

Thereafter, the classification apparatus performs classification of websites included in a URL list for testing (a list of URLs of websites to be classified) by using the classifier that has been generated.

For example, the classification apparatus accesses, through the crawler unit 121, the websites included in the URL list for testing, and accumulates access result data for the websites into the access result DB. Through the update history generation unit 122, the classification apparatus makes comparison between sets of access result data for each website, the sets of access result data having been accumulated in the access result DB, and generates update histories of the websites. Thereafter, the classification apparatus performs classification of whether or not each website included in the URL list for testing has a possibility of being abused in the future, by using the classifier and feature values that are the update histories of the websites included in the URL list for testing, and outputs a result of the classification.

As a result, the classification apparatus is able to accurately detect beforehand a website having a possibility of being abused due to a state of management of the website by an administrator thereof.

Configuration

Figure 2:
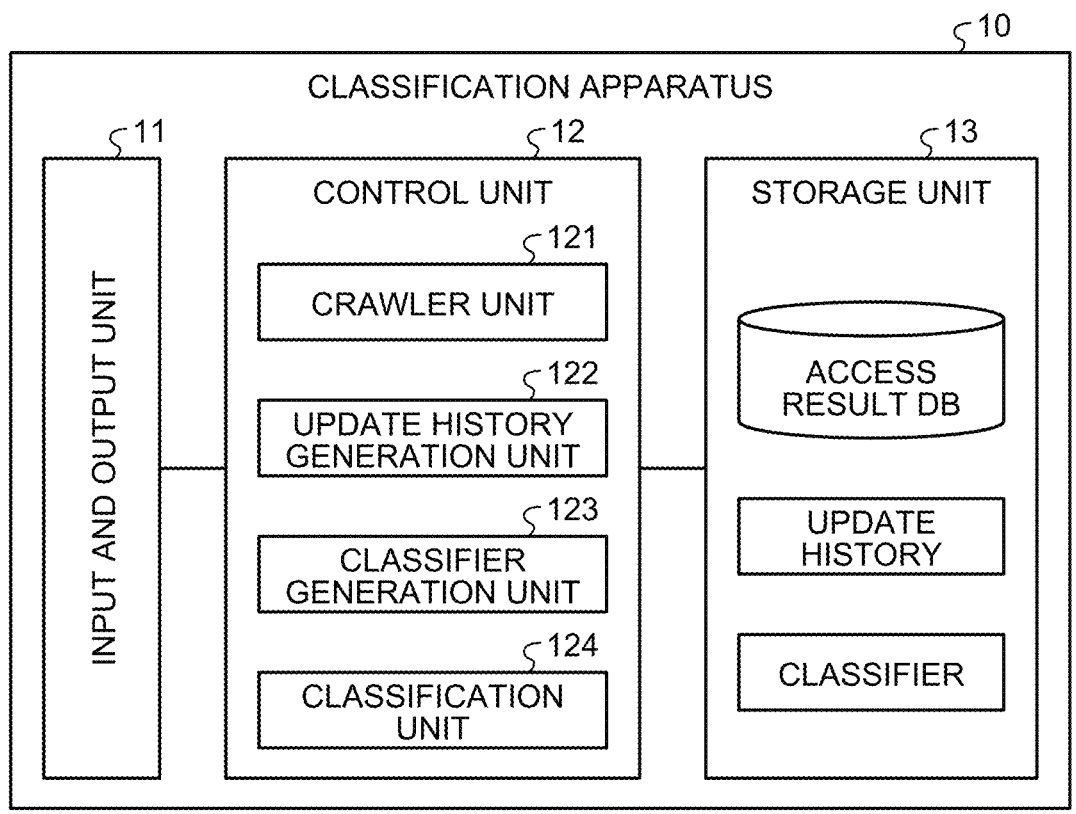
FIG. 2 is a block diagram illustrating an example of a configuration of the classification apparatus.

Described next by use of FIG. 2 is a configuration of a classification apparatus 10. As illustrated in FIG. 2, the classification apparatus 10 includes an input and output unit 11, a control unit 12, and a storage unit 13.

The input and output unit 11 is an input and output interface that receives input of various URL lists and outputs, for example, a result of classification by a classifier, for websites represented by URLs. Furthermore, this input and output unit 11 serves as a communication interface for the crawler unit 121 or the like to make access to an external network, such as the Internet.

The control unit 12 controls the overall classification apparatus 10. This control unit 12 includes the crawler unit 121, the update history generation unit 122, the classifier generation unit 123, and a classification unit 124.

Crawler Unit

The crawler unit 121 makes access to websites of specified URLs and collects (or acquires) various types of information. For example, at predetermined intervals, the crawler unit 121 makes access to websites included in a URL list, collects access result data for the websites accessed, and accumulates the access result data into the access result DB. The access result data include information on the websites (for example, the web application information described later) updated due to management by administrators of the websites. The crawler unit 121 is implemented by, for example, a browser for accessing the websites, or execution of a crawler program.

URL lists input to the crawler unit 121 are, for example, the URL lists for learning (the unmalicious URL list for learning and the malicious URL list for learning) and the URL list for testing.

URL lists provided by service (Document 1) for archiving past states of websites not detected to have been abused (unmalicious websites) and websites detected to have been abused (malicious websites) as described above, for example, are used as the unmalicious URL list for learning and the malicious URL list for learning.

Furthermore, a malicious URL list including URLs of websites detected beforehand to have been abused (for example, a known malicious URL list described in Document 2 or 3 cited below) may be used, for example, by use of an existing technique (for example, anti-virus software or a technique described in Non-Patent Literature 1, 2, or 3).
Document 2: OpenDNS, "PhishTank", https://www.phishtank.com/Document
3: Malwarebytes, "hpHosts", https://www.hosts-file.net/

In this case, based on the known malicious URL list, for example, the crawler unit 121 makes access to websites that have been archived at times before detection of abuse and collects access result data. The crawler unit 121 then accumulates the access result data collected, as access result data before detection of abuse (a series of access result data prior to the detection of abuse), into the access result DB. The crawler unit 121 may constantly access a website represented by a specific URL for a predetermined period, and if the crawler unit 121 detects abuse of the website through the existing technique, the crawler unit 121 may use access result data that have been collected prior to that detection as access result data before detection of abuse.

Furthermore, the access result data for the website collected by the crawler unit 121 include information composing the website. For example, the access result data for the website include at least one of: web server information on the website acquired from an HTTP header of the website; web application information on the website acquired from an HTTP body of the website (for example, a meta tag of the HTTP body); and CMS information on the website. For example, the access result data include web server information acquired from a server header or an X-Powered-By header included in an HTTP header, web application information acquired from a meta tag included in an HTTP body, and CMS information acquired from a path string of the URL. The CMS information is, for example, information indicating whether or not a CMS of the website is able to be identified from each of pieces of information that are the URL of the website, the HTTP header, and the meta tag of the HTTP body.

For example, in access result data illustrated in FIG. 3, CMS information is information, such as "detect-url" indicating identifiability of a CMS from a URL, "detect-meta" indicating identifiability of the CMS from a meta tag, and "detect-header" indicating identifiability of the CMS from an HTTP header. Furthermore, in the access result data illustrated in FIG. 3, web server information is information, such as "Server header" and "X-Powered-By header". In addition, in the access result data illustrated in FIG. 3, web application information is information, such as "meta[generator]" that is a generator attribute value of the meta tag.

When whether or not a website has a possibility of being abused is determined according to a conventional technique, information focused on content inserted by defacement or malicious content, such as an attack code, is used as a feature value. In contrast, the classification apparatus 10 according to the embodiment uses, as a feature value, information that is able to be updated by an administrator of a website, such as web server information on the website or web application information, as described above. However, the feature value may be any information that is able to be updated by the administrator of the website, and is not necessarily the web server information or web application information described above.

Access Result Data

Access result data accumulated in the access result DB will be described by use of FIG. 3. For example, the access result data accumulated in the access result DB include information, such as: "ID" that is identification information of each set of access result data; "Date" that is a date and time of access to a website; "URL" that is a URL of the website that has been accessed; "Number of URLs" that is the number of URLs that are additionally accessed when the URL is accessed; "meta[generator]" that is a generator attribute value of a meta tag of an HTTP body; "Server header" and "X-Powered-By header" included in an HTTP header; "detect-url" indicating whether or not identification of a CMS is possible from the URL; "detect-meta meta" indicating whether or not identification of the CMS is possible from the meta tag; and "detect-header" indicating whether or not identification of the CMS is possible from the HTTP header.

Furthermore, values of "detect-url", "detect-meta", and "detect-header", that is, "True" (identification of the CMS being possible) or "False" (identification of the CMS not being possible), in the above described access result data, are determined by the crawler unit 121, based on an existing technique (for example, a technique described in Document 4 cited below).
Document 4: Wappalyzer, https://wappalyzer.com/

When the crawler unit 121 makes access to a website included in a URL list for learning, the crawler unit 121: assigns identification information to access result data for the website, the identification information indicating whether the website to be accessed is of an unmalicious URL (a website that has not been abused) or of a malicious URL (a website that has been abused); and accumulates the access result data assigned with the identification information, into the access result DB.

Update History Generation Unit

Based on the access result data accumulated in the access result DB (as seen in FIG. 3), the update history generation unit 122 in FIG. 2 generates an update history of a website. For example, the update history generation unit 122 acquires, from the access result DB, sets of access result data for the same URL (called a seed URL) and makes comparison between the sets of access result data in chronological order. For example, the update history generation unit 122 makes comparison between pieces of information included in the sets of access result data to be compared (for example, comparison between character strings and numerical values, and comparison between truth values), and stores results of the comparison as an update history of the website of the seed URL, into the storage unit 13.

When generating an update history of a website included in the malicious URL list for learning, the update history generation unit 122 generates the update history of the website that has been abused, based on access result data before detection of abuse of the website from access result data for the website.

This will be described by use of a specific example. Considered, for example, is a case where access result data for dates and times over a period from before detection of abuse of a website included in the malicious URL list for learning to after the detection of the abuse have been accumulated, as access result data for the website (the website that has been abused), into the access result DB.

Figure 4:
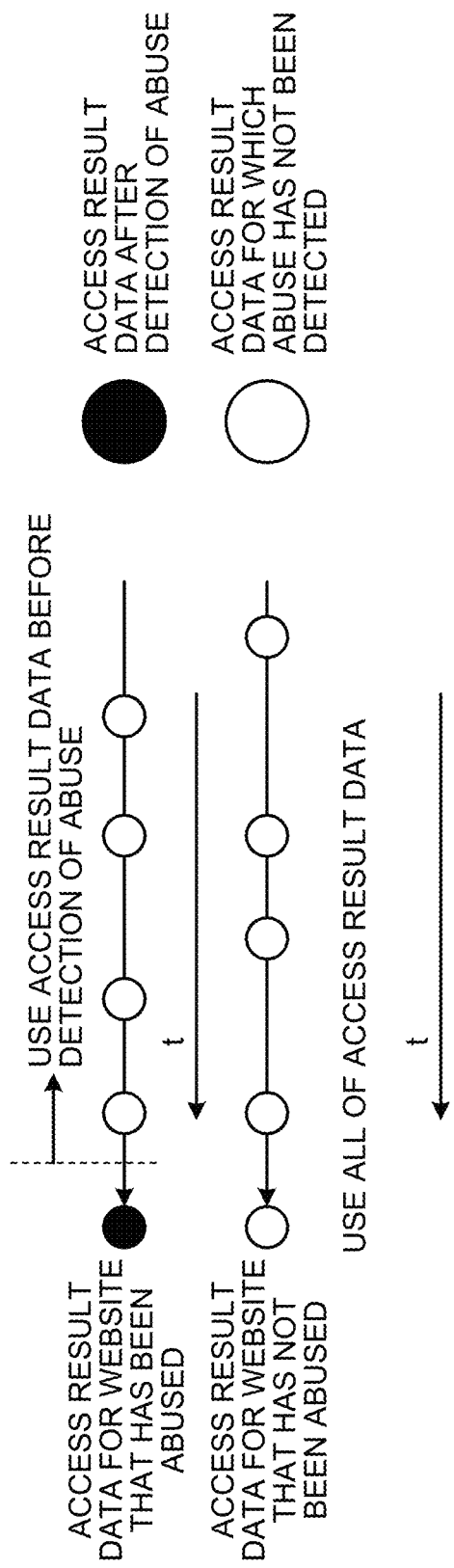
FIG. 4 is a diagram for explanation of generation of update histories.

In this case, as illustrated in FIG. 4, the update history generation unit 122 uses the access result data before detection of abuse (access result data not detected to have been abused) from the access result data for the website for the dates and times, in generating an update history of the website that has been abused. That is, for the website that has been abused, the update history generation unit 122 generates the update history of the website by using the access result data for dates and times prior to the detection of abuse.

In contrast, when generating an update history of a website included in the unmalicious URL list for learning (a website that has not been abused), the update history generation unit 122 generates the update history of the website by using all of access result data for the website (access result data for every date and time).

The generation of the update history by the update history generation unit 122 will be described by use of a specific example. Considered, for example, is a case where the update history generation unit 122 generates an update history of a website (http://c.example) by making comparison between sets of access result data (ID=101 to 103) for a seed URL, "http://c.example", from the access result data illustrated in FIG. 3, for each of the items (for example, "Date", "meta[generator]", "Server header", "X-Powered-By header", "detect-url", "detect-meta", and "detect-header").

In this case, the update history generation unit 122 firstly compares the sets of access result data between ID=101 and ID=102 and records results of the comparison (assigned with a reference symbol 501) as illustrated in FIG. 5. Next, the update history generation unit 122 compares the sets of access result data between ID=102 and ID=103, and records results of the comparison (assigned with a reference symbol 502) as an update history (as seen with an example of an update history for the seed URL, "http://c.example", in FIG. 6 (a case where the number of times comparison is made is two)).

For example, in a case where the compared data in sets of access result data to be compared are a character string, the update history generation unit 122 records "Up" if the character string has become observable, "Stable" if the character string has not changed, "Updated" if the character string has changed, and "Down" if the character string has become unobservable, into an update history.

Furthermore, in a case where the compared data are a numerical value, the update history generation unit 122 records "Up" if the numerical value has increased, "Stable" if the numerical value has not changed, and "Down" if the numerical value has decreased, into the update history. In addition, in a case where the compared data are a truth value, comparison similar to that for a numerical value is performed, and the update history generation unit 122 records "Up" if the truth value has changed from falsity to truth, "Stable" if the truth value has not changed, and "Down" if the truth value has changed from truth to falsity, into the update history.

Furthermore, the update history generation unit 122 may use numerical values or character strings other than "Up", "Stable", "Updated", and "Down", as long as a change in value is able to be represented uniquely. In addition, the update history generation unit 122 accepts data types other than those of character strings, numerical values, and truth values, according to data collected by the crawler unit 121.

Furthermore, the update history generation unit 122 may record a time interval (the number of months) between access dates and times for the seed URL into the update history (as seen in FIG. 6 as "Delta"), the time interval having been acquired by comparison between values for "Date" in the access result data as illustrated in FIG. 3.

By inclusion of the time interval (the number of months) between the access dates and times for the seed URL as described above, the classifier generation unit 123 is able to generate a classifier in consideration of a feature value that is the time interval between the access dates and times for the seed URL when the classifier generation unit 123 generates the classifier. Classification accuracy for websites that may be abused in the future is able to be improved by the classification unit 124 receiving input of an update history including a time interval between access dates and times for a website to be classified and performing classification by using a classifier as described above.

Furthermore, if a time interval between sets of access result data for the same seed URL (the value of "Delta" in FIG. 6) is not greater than a predetermined time interval, the update history generation unit 122 may generate an update history by using an older set of access result data for the same seed URL.

Update histories used by the classifier generation unit 123 in generating a classifier each need to be an update history that has been acquired by comparison between sets of access result data for the same seed URL for the same number of times. Therefore, the update history generation unit 122 executes the following processing in order to make the number of times comparison is made between sets of access result data the same for all of the update histories of the access result data used in generating a classifier.

For example, considered is a case where an update history used in generation of a classifier needs to be an update history acquired by comparison between sets of access result data for three times, but only three sets of access result data for the same seed URL have been accumulated in the access result DB (that is, comparison is able to be made only twice).

In this case, after recording results of comparison for two times between sets of access result data for the same seed URL into an update history, the update history generation unit 122 records, as a result of comparison for the third time, a missing value (for example, "−1") into the update history.

For example, after recording, as an update history for the seed URL, "http://c.example", results of comparison between sets of access result data (ID=101 to 103) illustrated in FIG. 5 (results of comparison for two times), the update history generation unit 122 generates an update history having "−1" as a result of comparison for the third time (as seen in an example of an update history for the seed URL, "http://c.example" in FIG. 6 (the case where the number of times comparison is made is three)). Although "−1" is used as the missing value in the above described example, any value other than "−1" may be used as long as the value is able to be determined as the missing value.

As a result, the update history generation unit 122 is able to generate update histories resulting from comparison between sets of access result data for the same number of times for each of the update histories used in generation of a classifier. Any value may be set as the number of times comparison between sets of access result data is made.

Classifier Generation Unit

The classifier generation unit 123 in FIG. 2 generates a classifier that classifies websites having a possibility of being abused in the future, by performing machine learning or the like using feature values that are update histories of websites that have not been abused and update histories of websites that have been abused.

For example, the classifier generation unit 123 reads out update histories of websites included in the unmalicious URL list for learning and update histories of websites included in the malicious URL list for learning, both of which are stored in the storage unit 13. The classifier generation unit 123 then generates feature vectors representing the update histories of the websites included in the unmalicious URL list for learning and feature vectors representing the update histories of the websites included in the malicious URL list for learning. Thereafter, the classifier generation unit 123 generates a classifier that classifies websites having a possibility of being abused in the future, by performing machine learning or the like using unmalicious data that are the feature vectors representing the update histories of the websites included in the unmalicious URL list for learning and malicious data that are the feature vectors representing the update histories of the websites included in the malicious URL list for learning.

For example, the classifier generation unit 123 generates a feature vector illustrated in FIG. 7 as a feature vector representing the update history for the seed URL "http://c.example" illustrated in FIG. 6 (the case where the number of times comparison is made is three). Although illustration thereof is omitted, the feature vector has been assigned with identification information indicating whether the feature vector is a feature vector of malicious data or a feature vector of unmalicious data. The classifier generation unit 123 then generates a classifier that classifies websites having a possibility of being abused in the future by performing machine learning or the like by using feature vectors including the identification information.

Classification Unit

The classification unit 124 in FIG. 2 classifies websites having a possibility of being abused in the future by using the classifier generated by the classifier generation unit 123, and outputs a result of the classification. For example, the classification unit 124 performs classification of whether or not each website included in the URL list for testing has a possibility of being abused in the future by using feature vectors representing update histories of websites included in the URL list for testing and the classifier generated by the classifier generation unit 123, and outputs a result of the classification.

Processing Procedure

Figure 8:
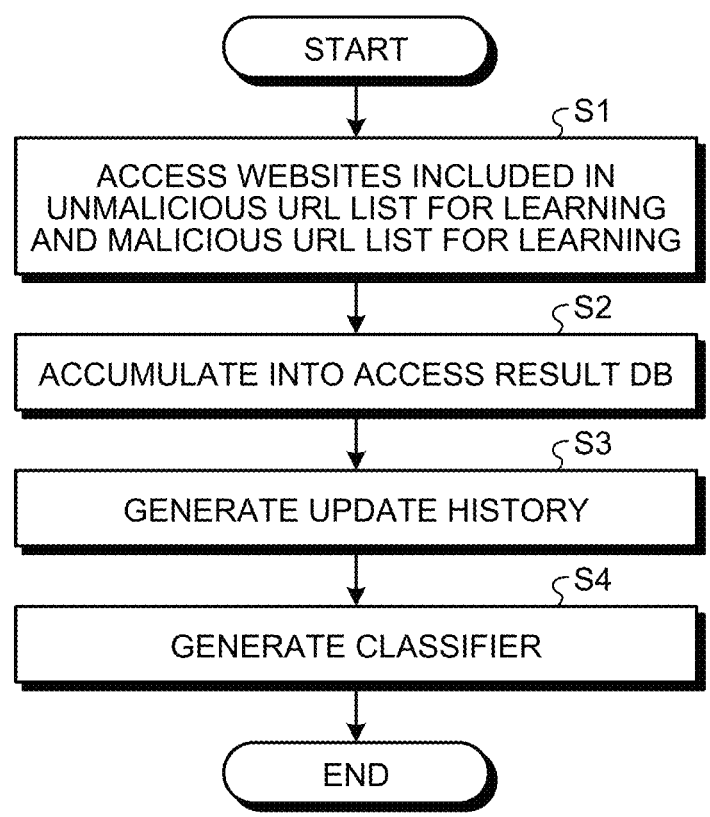
FIG. 8 is a flow chart illustrating an example of a procedure for generation of a classifier by the classification apparatus in FIG. 2.

Next, an example of a procedure of processing by the classification apparatus 10 will be described by use of FIG. 8 and FIG. 9. Firstly, a procedure where the classification apparatus 10 generates a classifier will be described by use of FIG. 8.

The crawler unit 121 of the classification apparatus 10 makes access to websites included in the unmalicious URL list for learning and malicious URL list for learning (S1), and accumulates access result data acquired, into the access result DB (S2). Thereafter, the update history generation unit 122 generates an update history by acquiring, in chronological order, sets of access result data related to the same seed URL that have been accumulated in the access result DB (S3). The classifier generation unit 123 then generates a classifier that performs classification of whether or not each website has a possibility of being abused in the future by performing machine learning or the like using the update histories related to the websites included in the unmalicious URL list for learning and the update histories related to the websites included in the malicious URL list for learning (S4).

Figure 9:
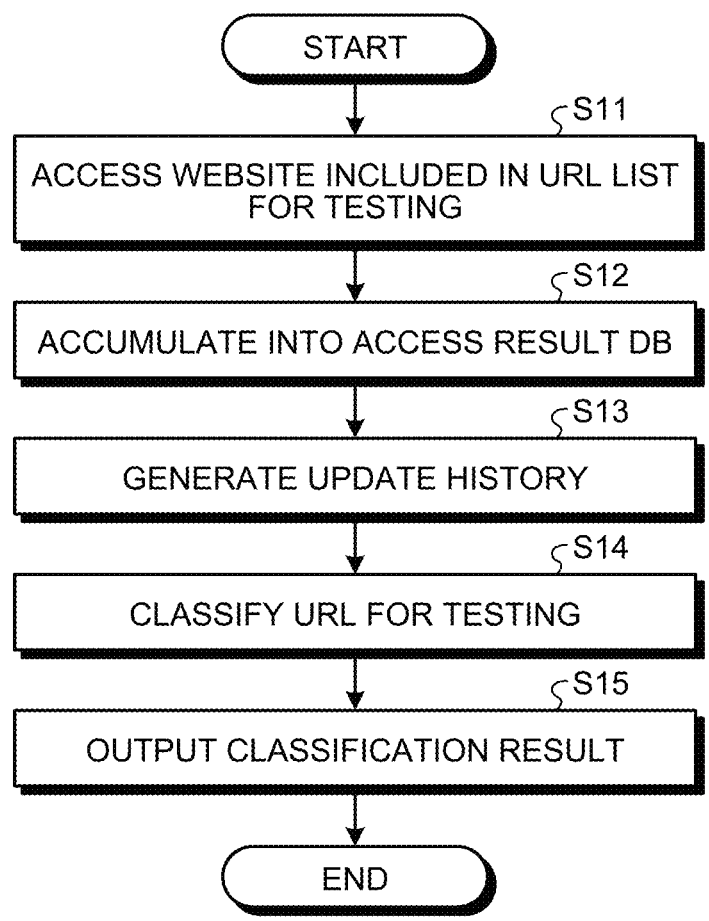
FIG. 9 is a flow chart illustrating an example of a procedure for classification by the classification apparatus in FIG. 2.

Described next by use of FIG. 9 is a procedure in which websites having a possibility of being abused in the future are classified, for websites included in the URL list for testing, by use of the classifier generated by the classification apparatus 10.

Firstly, the crawler unit 121 of the classification apparatus 10 makes access to a website included in the URL list for testing (S11), and accumulates access result data acquired through the access, into the access result DB (S12). Thereafter, similarly to S2 in FIG. 8, the update history generation unit 122 generates an update history by acquiring, in chronological order, sets of access result data related to the same seed URL, the sets of access result data having been accumulated in the access result DB (S13). By using the classifier generated at S4 in FIG. 8, the classification unit 124 performs classification of URLs for testing, the URLs being included in the URL list for testing (S14). For example, by using a feature vector representing the update history of the website represented by the URL for testing and the classifier generated at S4 in FIG. 8, the classification unit 124 performs classification of whether or not the website included in the URL list for testing is a website having a possibility of being abused in the future. The classification unit 124 then outputs a result of the classification (a classification result) of S14 (S15).

As a result, the classification apparatus 10 is able to accurately detect beforehand a website having a possibility of being abused due to a state of management of the website by an administrator thereof.

Figure 10:
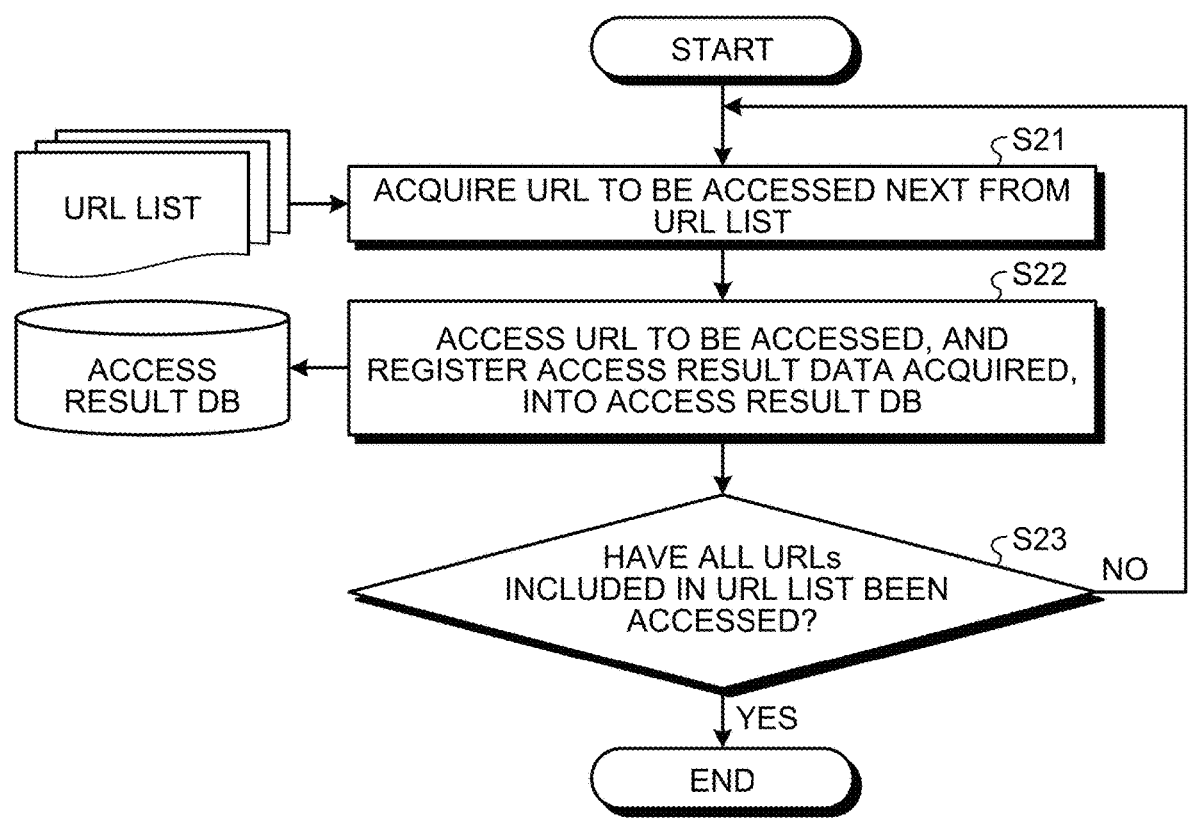
FIG. 10 is a flow chart illustrating an example of processing for accumulation of access result data into the access result DB by the classification apparatus in FIG. 2.

Processing in which the crawler unit 121 accumulates access result data into the access result DB (S1 and S1 of FIG. 8 and S11 and S12 of FIG. 9) will be described next in detail by use of FIG. 10.

The crawler unit 121 acquires a URL to be accessed next from a URL list that has been input (S21), makes access to the acquired URL to be accessed, and registers access result data that have been acquired, into the access result DB (S22). If the crawler unit 121 then determines that the crawler unit 121 has made access to all of URLs included in the URL list (Yes at S23), the crawler unit 121 ends the processing, and if there is a URL that has not been accessed yet in the URL list (No at S23), the crawler unit 121 returns to S21.

Figure 11:
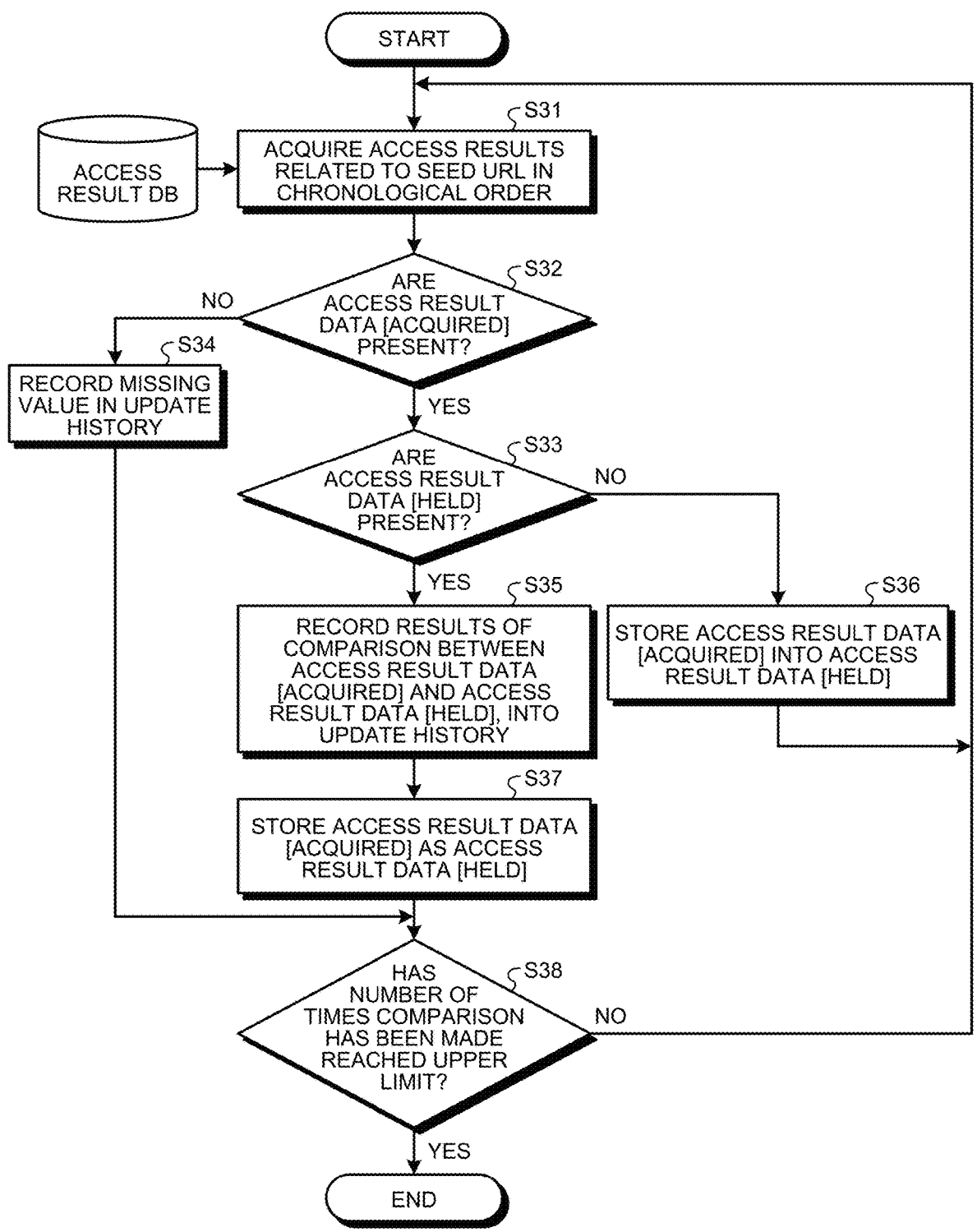
FIG. 11 is a flow chart illustrating an example of processing for generation of an update history by the classification apparatus in FIG. 2.

Next, processing in which the update history generation unit 122 generates an update history related to a seed URL by using access result data that have been accumulated in the access result DB (S3 of FIG. 8 and S13 of FIG. 9) will be described in detail by use of FIG. 11.

Firstly, the update history generation unit 122 attempts to acquire, in chronological order, access result data related to a seed URL from the access result DB (S31), and if the access result data have been able to be acquired (Yes at S32, "Are access result data [acquired] present?"), the update history generation unit 122 proceeds to S33. On the contrary, if access result data related to the seed URL have been unable to be acquired, in chronological order, from the access result DB (No at S32, "Are access result data [acquired] present?"), the update history generation unit 122 records a missing value (for example, "−1") into the update history (S34) and proceeds to S38.

At S33, the update history generation unit 122 checks for presence of access result data (access result data [held]) that have been used in the last comparison of access result data, and if the access result data [held] are present (Yes at S33), the update history generation unit 122 proceeds to S35. On the contrary, if the access result data [held] are not present (No at S33), the update history generation unit 122 stores the access result data [acquired] into the access result data [held] (S36), and returns to S31.

At S35, the update history generation unit 122 records a result of comparison between the access result data [acquired] and the access result data [held], into the update history (S35). Thereafter, the update history generation unit 122 stores the access result data [acquired] as the access result data [held] (S37). That is, the update history generation unit 122 stores the access result data [acquired] into a predetermined area of the storage unit 13 as data for comparison with access result data to be acquired next. Thereafter, the update history generation unit 122 proceeds to S38.

At S38, if the number of times comparison has been made between sets of access result data has reached an upper limit (Yes at S38), the update history generation unit 122 ends the processing, and if the number of times comparison has been made between sets of access result data has not reached the upper limit (No at S38), the update history generation unit 122 returns to S31. The update history generation unit 122 generates an update history for each seed URL as described above.

In this classification apparatus 10, a classifier that classifies websites having a possibility of being abused in the future is generated by use of feature values that are update histories of access result data for websites, the update histories including states of management by administrators of the websites. As a result, the classification apparatus 10 is able to accurately perform classification of whether or not each website is a website having a possibility of being abused in the future.

According to the above described embodiment, the generation of a classifier and the classification of websites by use of the classifier are performed by the classification apparatus 10, but they are not necessarily performed by the classification apparatus 10. For example, the classification apparatus 10 may perform only the generation of a classifier, and the classification of websites by use of the classifier may be performed by another apparatus.

Program

Furthermore, implementation is possible by installation of a program that implements the above described functions of the classification apparatus 10 according to the embodiment in a desired information processing apparatus (computer). For example, by the information processing apparatus being caused to execute the program, which is provided as package software or online software, the information processing apparatus is able to be caused to function as the classification apparatus 10. The information processing apparatus referred to herein includes a desktop or laptop personal computer. In addition, the information processing apparatus may instead be: a mobile communication terminal, such as a smartphone, a cellular phone, or a personal handyphone system (PHS); or a personal digital assistant (PDA). Furthermore, the functions of the classification apparatus 10 may be implemented by a cloud server.

Figure 12:
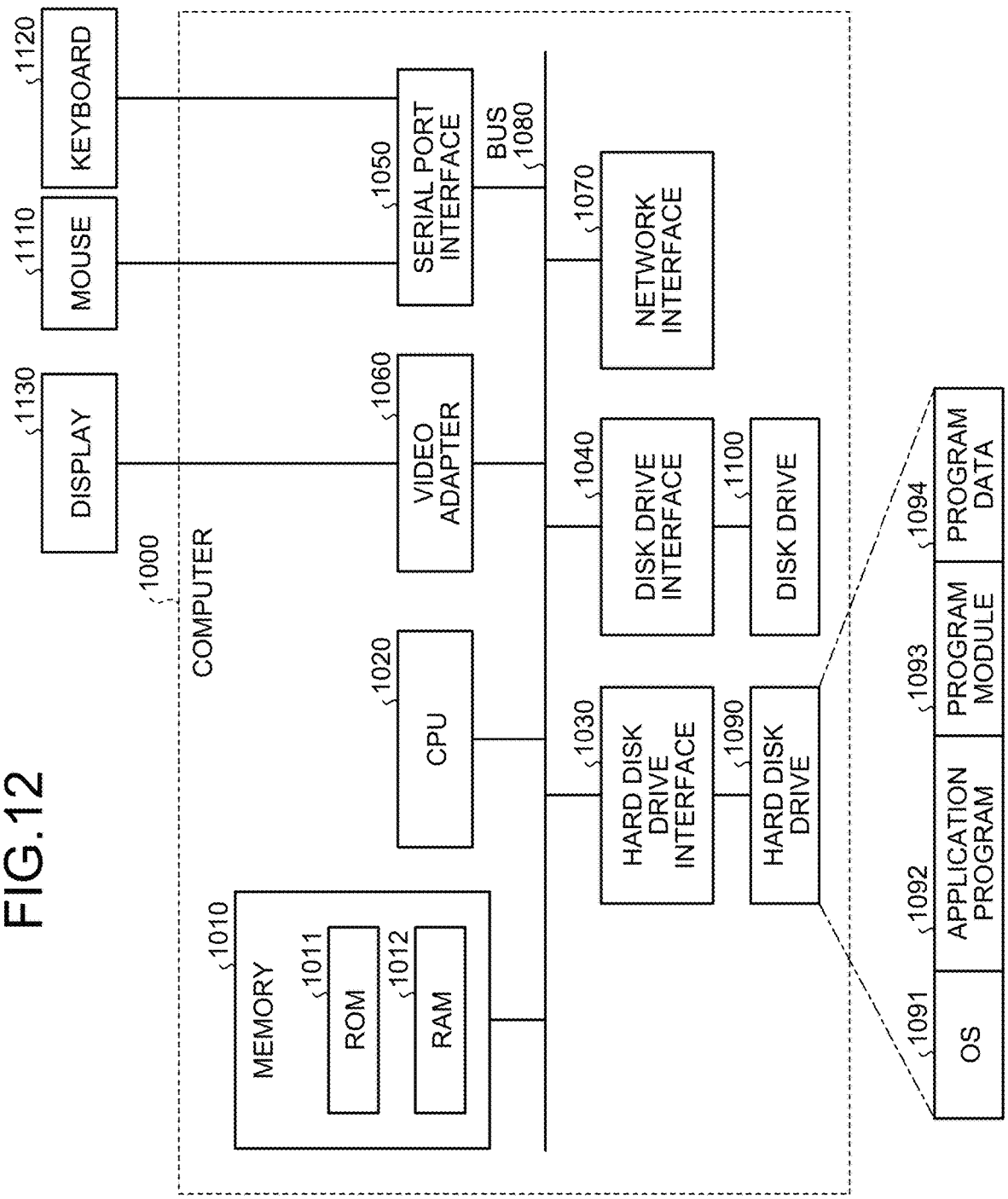
FIG. 12 is a diagram illustrating a computer that executes a classification program.

Described below by use of FIG. 12 is an example of a computer that executes this program (a classification program). As illustrated in FIG. 12, a computer 1000 has, for example, a memory 1010, a CPU 1020, a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011 and a random access memory (RAM) 1012. The ROM 1011 stores therein, for example, a boot program, such as a basic input output system (BIOS). The hard disk drive interface 1030 is connected to a hard disk drive 1090. The disk drive interface 1040 is connected to a disk drive 1100. An attachable and detachable storage medium, such as a magnetic disk or an optical disk, for example, is inserted into the disk drive 1100. A mouse 1110 and a keyboard 1120, for example, are connected to the serial port interface 1050. A display 1130, for example, is connected to the video adapter 1060.

As illustrated in FIG. 12, the hard disk drive 1090 stores therein, for example, an OS 1091, an application program 1092, a program module 1093, and program data 1094. The various data and information according to the embodiment described above are, for example, stored in the hard disk drive 1090, and/or the memory 1010.

The CPU 1020 loads the program module 1093 and/or the program data 1094 stored in the hard disk drive 1090, into the RAM 1012 as necessary, and executes the above described procedures.

The program module 1093 and the program data 1094 related to the classification program are not necessarily stored in the hard disk drive 1090, and for example, may be stored in an attachable and detachable storage medium and read out by the central processing unit (CPU) 1020 via the disk drive 1100 or the like. Or, the program module 1093 and the program data 1094 related to the program may be stored in another computer connected via a network, such as a local area network (LAN) or a wide area network (WAN), and read out by the CPU 1020 via the network interface 1070.

REFERENCE SIGNS LIST

10 CLASSIFICATION APPARATUS
11 INPUT AND OUTPUT UNIT
12 CONTROL UNIT
13 STORAGE UNIT
121 CRAWLER UNIT
122 UPDATE HISTORY GENERATION UNIT
123 CLASSIFIER GENERATION UNIT
124 CLASSIFICATION UNIT

The invention claimed is:

1. A classification apparatus, comprising:
a memory; and
a processor coupled to the memory and programmed to execute a process comprising:
acquiring access result data for websites updated by administrators of the websites, the access result data including a plurality of items of information on the websites;
first generating update histories of the websites by making comparison between sets of access result data for each of the plurality of items in chronological order and recording changes indicated by the comparison into the update histories of the websites; and
second generating a classifier that classifies a website having a possibility of being abused in the future by using feature values that are the update histories of the websites,
wherein the access result data for the websites include access result data for websites that have not been abused and only pre-abuse access result data for websites that have been abused, wherein the first generating executes processing of generating update histories of the websites that have not been abused by making comparison in chronological order between sets of access result data for the websites that have not been abused and processing of generating update histories of the websites that have been abused by making comparison in chronological order between sets of access result data before abuse for the websites that have been abused, and wherein the second generating generates the classifier that classifies the websites having the possibility of being abused in the future, by performing machine learning, by using features values of the update histories of the websites that have not been abused and feature values of the update histories of the websites that have been abused.

2. The classification apparatus according to claim 1, wherein the access result data for the websites include at least one of:
- web server information on the websites acquired from HTTP header information on the websites;
- web application information on the websites acquired from HTTP bodies; and
- CMS information indicating whether or not content management systems (CMSs) of the websites are able to be identified from each of pieces of information that are URLs of the websites, HTTP header information, and the web application information.

3. The classification apparatus according to claim 2, wherein the web server information is information indicating at least one of:
- web server software used in the websites; and
- programming languages used in the websites.

4. The classification apparatus according to claim 1, wherein when making the comparison between the sets of access result data for the websites in chronological order, the first generating includes, in the update histories of the websites, differences between access dates and times for the websites indicated by the compared sets of access result data.

5. The classification apparatus according to claim 1, the process further comprising:
- classifying websites having a possibility of being abused in the future by using:
- update histories of access result data for websites to be classified; and
- the classifier.

6. A classification method, including:
- a step of acquiring, at a classification apparatus that classifies websites having a possibility of being abused in the future, access result data for a website updated by an administrator of the website, the access result data including a plurality of items of information on the website;
- a step of first generating, at the classification apparatus, an update history of the website by making comparison for each of the plurality of items in chronological order between sets of access result data for the website and recording changes indicated by the comparison into the update histories of the websites; and
- a step of second generating, at the classification apparatus, a classifier that classifies a website having a possibility of being abused in the future, by using, as a feature value, the update history of the website, wherein the access result data for the websites include access result data for websites that have not been abused and only pre-abuse access result data for websites that have been abused, wherein the first generating executes processing of generating update histories of the websites that have not been abused by making comparison in chronological order between sets of access result data for the websites that have not been abused and processing of generating update histories of the websites that have been abused by making comparison in chronological order between sets of access result data before abuse for the websites that have been abused, and wherein the second generating generates the classifier that classifies the websites having the possibility of being abused in the future, by performing machine learning, by using features values of the update histories of the websites that have not been abused and feature values of the update histories of the websites that have been abused.

7. A non-transitory computer-readable recording medium having stored therein classification program for classifying a website having a possibility of being abused in the future, the classification program causing a computer to execute a process comprising:
- acquiring access result data for a website that is updated by an administrator of the website, the access result data including a plurality of items of information on the website;
- first generating an update history of the website by making comparison for each of the plurality of items in chronological order between sets of access result data for the website and recording changes indicated by the comparison into the update histories of the websites; and
- second generating a classifier that classifies a website having a possibility of being abused in the future, by using, as a feature value, the update history of the website, wherein the access result data for the websites include access result data for websites that have not been abused and only pre-abuse access result data for websites that have been abused, wherein the first generating executes processing of generating update histories of the websites that have not been abused by making comparison in chronological order between sets of access result data for the websites that have not been abused and processing of generating update histories of the websites that have been abused by making comparison in chronological order between sets of access result data before abuse for the websites that have been abused, and wherein the second generating generates the classifier that classifies the websites having the possibility of being abused in the future, by performing machine learning, by using features values of the update histories of the websites that have not been abused and feature values of the update histories of the websites that have been abused.

* * * * *